United States Patent
Zhu et al.

(10) Patent No.: US 9,524,550 B2
(45) Date of Patent: Dec. 20, 2016

(54) SYSTEM AND METHOD FOR CORONARY DIGITAL SUBTRACTION ANGIOGRAPHY

(75) Inventors: Ying Zhu, Monmouth Junction, NJ (US); Simone Prummer, Neunkirchen am Brand (DE); Peng Wang, Princeton, NJ (US); Terrence Chen, Princeton, NJ (US); Martin Ostermeier, Buckenholf (DE); Dorin Comaniciu, Princeton Junction, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 1790 days.

(21) Appl. No.: 12/774,146

(22) Filed: May 5, 2010

(65) Prior Publication Data

US 2011/0033102 A1    Feb. 10, 2011

Related U.S. Application Data

(60) Provisional application No. 61/175,567, filed on May 5, 2009.

(51) Int. Cl.
    *G06T 7/00*         (2006.01)

(52) U.S. Cl.
CPC ... *G06T 7/0016* (2013.01); *G06T 2207/10121* (2013.01); *G06T 2207/20224* (2013.01); *G06T 2207/30101* (2013.01)

(58) Field of Classification Search
CPC ............ G06T 2207/30101; G06T 2207/10121; G06T 7/0016
USPC ........................................................ 382/130
See application file for complete search history.

(56) References Cited

U.S. PATENT DOCUMENTS

| 5,557,684 | A | 9/1996 | Wang et al. |
| 5,647,360 | A * | 7/1997 | Bani-Hashemi .......... G06T 5/50 382/130 |
| 6,826,292 | B1 | 11/2004 | Tao et al. |
| 6,987,865 | B1 | 1/2006 | Szeliski et al. |
| 7,155,032 | B2 | 12/2006 | Szeliski et al. |
| 7,995,824 | B2 * | 8/2011 | Yim ....................... A61B 6/481 382/130 |

(Continued)

OTHER PUBLICATIONS

Barbu, A., et al., "Hierarchical Learning of Curves Application to Guidewire Localization in Fluoroscopy", IEEE Int'l. Conf. Comp. Vision and Pattern Rec., 2007.

(Continued)

*Primary Examiner* — Sheetal R Paulson

(57) ABSTRACT

A method and system for extracting coronary vessels fluoroscopic image sequences using coronary digital subtraction angiography (DSA) are disclosed. A set of mask images of a coronary region is received, and a sequence of contrast images for the coronary region is received. For each contrast image, a motion estimate is calculated between each of the mask images and a background region of the contrast image and a covariance is calculated for each motion estimate. Multiple background layer predictions are generated by generating a background layer prediction for each mask image based on the calculated motion estimate and covariance. The multiple background layer estimates are combined using statistical fusion to generate a final estimated background layer. The final estimated background layer is subtracted from the contrast image to extract a coronary vessel layer for the contrast image.

26 Claims, 5 Drawing Sheets

(56) References Cited

U.S. PATENT DOCUMENTS

2006/0285747 A1    12/2006  Blake et al.
2007/0116356 A1     5/2007  Gong et al.
2009/0010512 A1*    1/2009  Zhu et al. .................... 382/130
2009/0080729 A1     3/2009  Zhang et al.
2010/0034446 A1     2/2010  Zhu et al.

OTHER PUBLICATIONS

Coleman, T.F., et al., "A Reflective Newton Method for Minimizing a Quadractic Function Subject to Bounds on some of the Variables", SIAM Journal on Optimization, 1996.
Comaniciu, D., "Nonparametric Information Fusion for Motion Estimation", IEEE Conf. Comp. and Pattern Rec., 2003.
Freeman, W.T., et al., "The Design and Use of Steerable Filters", IEEE Transactions on Pattern Analysis and Machine Intelligence, 1991.
Tu, Z., "Probabilistic Boosting-Tree: Learning Discriminative Models for Classification, Recognition, and Clustering", IEEE Int'l. Conf. Comp. Vision, 2006.

\* cited by examiner

SYSTEM AND METHOD FOR CORONARY DIGITAL SUBTRACTION ANGIOGRAPHY

This application claims the benefit of U.S. Provisional Application No. 61/175,567, filed May 5, 2009, the disclosure of which is herein incorporated by reference.

BACKGROUND OF THE INVENTION

The present invention relates to fluoroscopic image sequences, and more particularly to detecting coronary vessel layers from fluoroscopic image sequences.

Angiography is a medical imaging technique in which X-ray images are used to visualize internal blood filled structures, such as arteries, veins, and the heart chambers. Since blood has the same radiodensity as the surrounding tissues, these blood filled structures cannot be differentiated from the surrounding tissue using conventional radiology. Thus, in angiography, a contrast agent is added to the blood, usually via a catheter, to make the blood vessels visible via X-ray. In many angiography procedures, X-ray images are taken over a period of time, which results in a sequence of fluoroscopic images, which show the motion of the blood over the period of time. Such fluoroscopic image sequences contain useful information that can be difficult to decipher due to the collapsing of 3-dimensional information into the 2-dimensional images.

In traditional computer imaging problems of motion estimation, occlusion handling or motion segmentation are typically the main concerns. Accordingly, traditional techniques for extracting objects of interest from image sequences typically use intensity based approaches to differentiate between objects in the image sequences. However, such traditional techniques can yield erroneous results in medical image sequences, such as fluoroscopic image sequences, which are generated using the phenomenon of transparency. Since various internal structures have different levels of transparency in the fluoroscopic images, these structures can overlap, and it may be difficult to accurately distinguish between these structures in the fluoroscopic image sequences using the traditional intensity based approaches.

BRIEF SUMMARY OF THE INVENTION

The present invention provides a method and system for extracting coronary vessels from fluoroscopic image sequences using coronary digital subtraction angiography (DSA). Embodiments of the present invention provide real-time extraction of coronary vessel layers for each frame of a fluoroscopic image sequence. Embodiments of the present invention utilize a Bayesian framework for tracking the moving layer of dynamic background structures to achieve coronary subtraction in cardiac fluoroscopic sequences. Dense motion estimation between mask images and a contrast image are used to predict the background layer of the contrast image. The predictions from multiple mask images are statistically fused to obtain the final estimation of the background layer of the contrast image, which can then be subtracted from the contrast image to generate the coronary vessel layer.

In one embodiment of the present invention, a set of mask images is received and a contrast image for the coronary region is received. The contrast image may be one of a sequence of contrast images. A dense motion field is calculated between each of the mask images and the background region of the contrast image and a covariance is calculated for each motion vector. Multiple background layer predictions are generated by generating a background layer prediction from each mask image based on the calculated motion field and covariances. The multiple background layer estimates are combined using statistical fusion to generate a final estimated background layer. The final estimated background layer is subtracted from the contrast image to extract a coronary vessel layer for the contrast image.

These and other advantages of the invention will be apparent to those of ordinary skill in the art by reference to the following detailed description and the accompanying drawings.

DETAILED DESCRIPTION OF EXEMPLARY EMBODIMENTS

Figure 1:
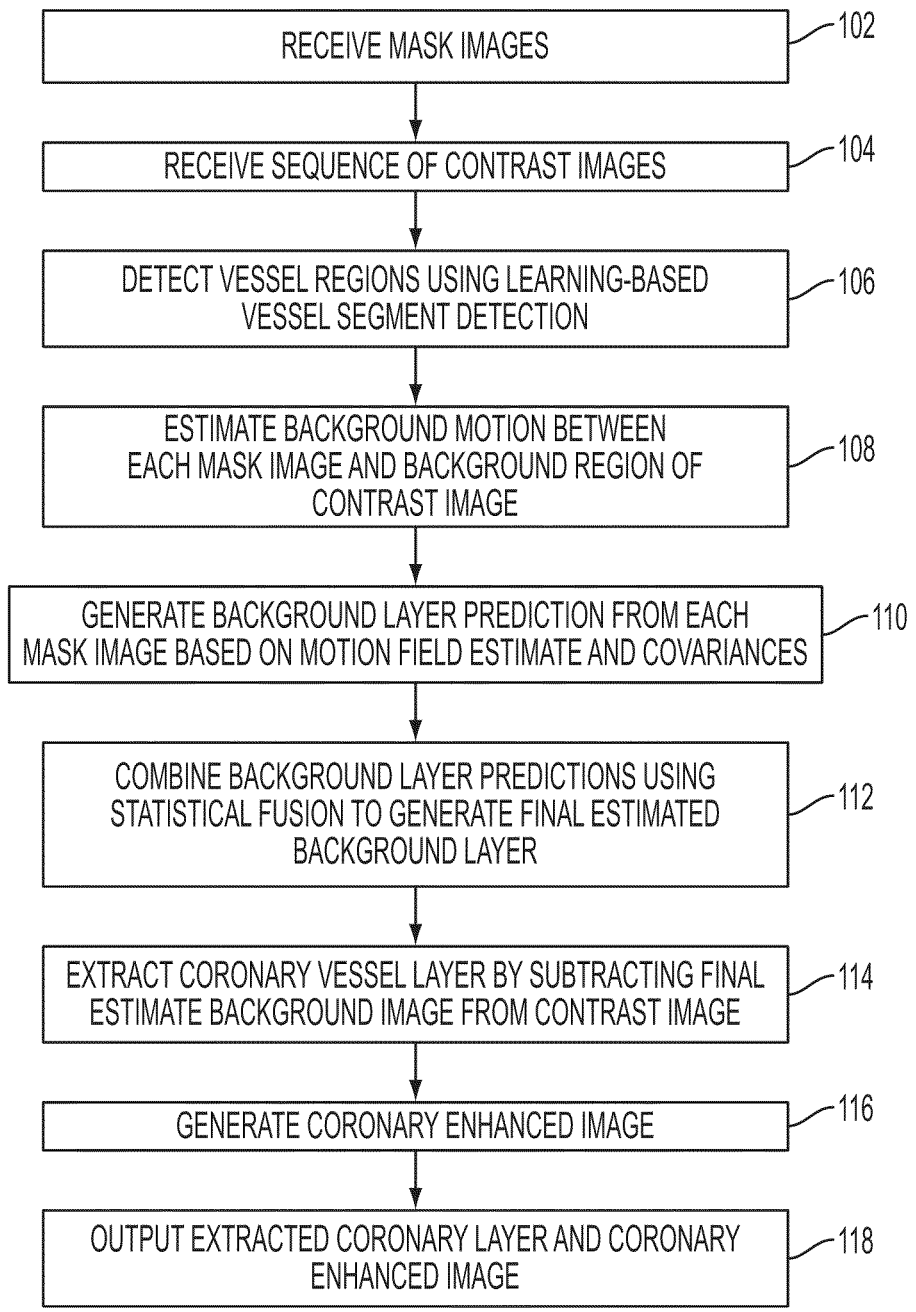
FIG. 1 illustrates a method for extracting coronary vessels from a fluoroscopic image sequence using coronary DSA according to an embodiment of the present invention.

The present invention is directed to a method for detecting coronary vessels from fluoroscopic images. Embodiments of the present invention are described herein to give a visual understanding of the coronary vessel extraction method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Digital subtraction angiography (DSA) is a technique for visualizing blood vessels in the human body. In DSA, a sequence of fluoroscopic images, referred to as contrast images, is acquired to show the passage of contrast medium that is injected into the vessel of interest. A sequence of fluoroscopic images contains multiple 2D X-ray images obtained in real time. The X-ray images record a certain field of view of a time period. Accordingly, motion of objects within the field of view can be observed in a sequence of fluoroscopic images. The background structures are largely removed from the contrast images by subtracting a mask image, which is an image acquired before contrast injection. However, the appearance of background structures in a contrast image and a mask image can differ due to fluctuation of radiation, acquisition noise, and patient motion. In traditional DSA where the mask image is directly subtracted from the contrast image, the difference between the background structures in the contrast images and the mask image can cause errors in detecting the blood vessels.

The main cause of differences in the appearance of background structures in a contrast image and a mask image is patient motion. Motion correction for DSA can involve various techniques for image motion estimation, where the motion between a contrast image and a mask image is obtained by warping one image to match the other. Commonly used matching criteria for motion estimation include optimization of various similarity or error measures, such as normalized cross-correlation, sum of absolute values of differences, variance of differences, etc. In the case of coronary DSA, cardiac motion and respiratory motion cause more severe differences between contrast images and mask images. Furthermore, because of the complexity of cardiac motion and breathing motion, the commonly used matching criteria are often violated in image regions of coronary vessels, making it more difficult to estimate the background motion around coronary vessels in coronary DSA.

Embodiments of the present invention provide a viable approach to coronary DSA that combines learning-based object detection, dense motion estimation, uncertainty propagation, and statistical fusion to achieve fully automatic and real-time coronary vessel subtraction. Embodiments of the present invention formulate coronary DSA as a problem to remove dynamic background structures from a contrast image. Pixel values in X-ray images are determined by the energy flux incident on the detector, which is commonly described as an exponential attenuation function as the X-ray beams pass through the layers of tissue. As a result, X-ray images are often dealt with in the logarithmic space and modeled as a linear superposition of multiple layers. In the case of coronary DSA, in an advantageous implementation of the present invention, only two layers are considered, a coronary layer and a background layer. The coronary layer is defined as a transparent image layer including coronary arteries filled with contrast medium. The background layer is defined as a transparent layer including background structures. A contrast image in a fluoroscopic sequence is denoted herein as $I_t(x)$, its coronary layer is denoted as $I_{C,t}(x)$, and it background layer is denoted as $I_{B,t}(x)$, where t is a time index and x is a pixel location. The formulation of layer composition after logarithmic post-processing can be expressed as $I_t(x)=I_{C,t}(x)+I_{B,t}(x)$. The goal of coronary DSA is to remove the background layer to extract the coronary arteries while both layers are undergoing cardiac and respiratory motion.

Figure 2:
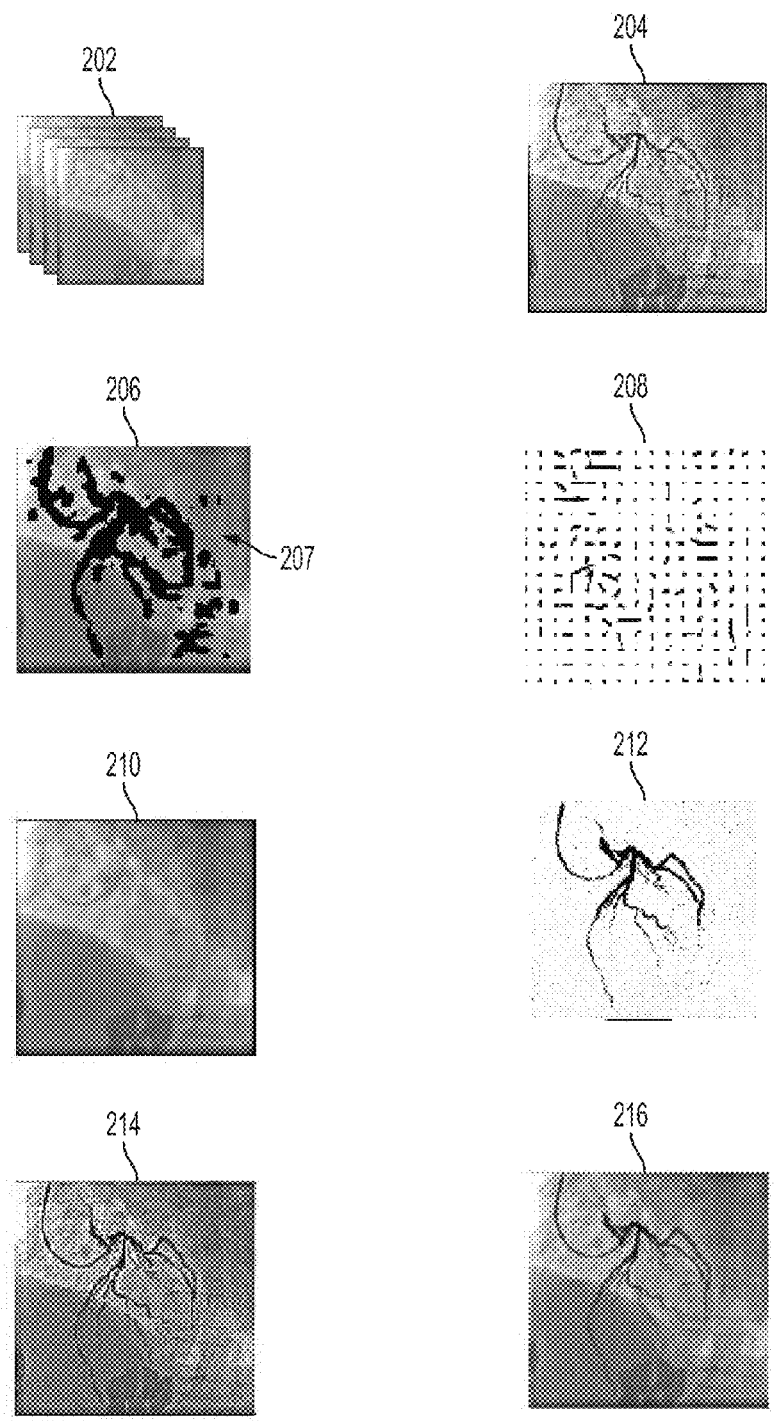
FIG. 2 illustrates exemplary images resulting from the steps of the method of FIG. 1.

FIG. 1 illustrates a method for extracting coronary vessels from a fluoroscopic image sequence using coronary DSA according to an embodiment of the present invention. FIG. 2 illustrates exemplary images resulting from the steps of the method of FIG. 1. The images of FIG. 2 are referred to below while describing the method steps of FIG. 1.

At step 102, multiple mask images are received. The mask images are fluoroscopic or X-ray images of a coronary region of a patient without any contrast agent injected into the coronary vessels. The mask images are acquired at different cardiac and breathing phases to serve as static masks for background estimation. For example, the mask images can be a sequence taken over the course of at least one cardiac cycle (heartbeat). Accordingly, the cardiac motion over the course of a full cardiac cycle is implicitly embedded in the set of mask images, such that background structures in various cardiac phases are captured in the set of mask images. The mask images can be received by acquiring the mask images directly from an X-ray scanning device. It is also possible that the mask images can be received by loading mask images that were previously acquired images and stored, for example, on a computer readable medium or storage of a computer system. When the set of mask images is received, the mask images are stored on a memory or storage of a computer system that is implementing the method of FIG. 1. As illustrated in FIG. 2, images 202 show a set of mask images.

At step 104, a sequence of contrast images is received. The sequence of contrast images can be electronic data representing fluoroscopic or X-ray images resulting from an X-ray procedure, such as an angiograph, in which a contrast agent is injected into the coronary vessels. The sequence of contrast images are images of the coronary region taken at a regular interval over a time frame. Each image in the sequence can be referred to as a frame. The contrast images can be received directly from an X-ray scanning device, or previously stored contrast images can be loaded. The sequence of contrast images are processed frame by frame to independently extract the coronary vessels for each contrast image in the sequence. Accordingly, steps 106-118 of FIG. 1 are performed independently for each contrast image in the sequence. These steps can be automatically performed for each contrast image in real-time as each contrast image in the sequence is received. Image 204 of FIG. 2 shows an exemplary contrast image.

At step 106, vessel regions in the contrast image are detected using learning-based vessel segment detection. In order to detect vessel regions in the contrast image, a vessel segment detector can be implemented using a binary classifier that separated the class of vessel images from the class of non-vessel images. The binary classifier is learned from a set of vessel images and non-vessel images using a probabilistic boosting tree (PBT) algorithm. To prepare a set of training samples, coronary vessels are manually annotated in a number of contrast images, local image patches containing the annotated vessels are used as the positive set of training samples, and patches away from the vessels are used as the negative training samples. The PBT algorithm learns a binary decision tree, where each node of the tree is a binary classifier by itself and is learned using the Adaboost algorithm. An extended set of Haar features can be used for training the boosted classifiers.

Figure 4:
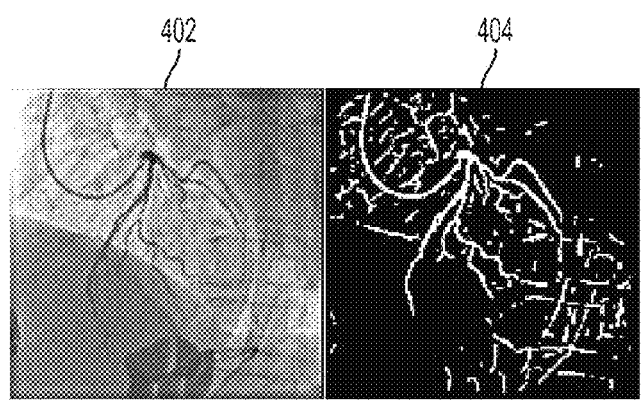
FIG. 4 illustrates ridge features extracted using steerable filters for an exemplary contrast image.

Given an image patch $I_{patch}$, the trained binary classifier calculates the posterior probability that a vessel segment appears in this image patch $p(vessel||I_{patch})$. A detected vessel region can be defined as the image area where vessel segments are detected with high probabilities (i.e., greater than a certain threshold). The remaining area of the image includes primarily background structures and is defined as the background region. To detect vessel segments with different thicknesses, the contrast image can be rescaled several times to generate a coarse-to-fine image pyramid, and the vessel segmentation detection can be performed at multiple scales. At each scale, in order to speed up vessel detection for a contrast image, it is possible to apply a set of efficient steerable filters to identify ridge features and their different orientations in the contrast image, and then perform the vessel detection using the binary classifier only at the ridge features. FIG. 4 illustrates ridge features extracted using steerable filters for an exemplary contrast image. As illustrated in FIG. 4, image 402 is an exemplary contrast image, and image 404 shows ridge features extracted from contrast image 402 using a set of steerable filters. Accordingly, in order to detect the vessel regions of contrast image 402, it is possible to perform vessel detection using the binary classifier only on the ridge features shown in image 404.

Figure 3:
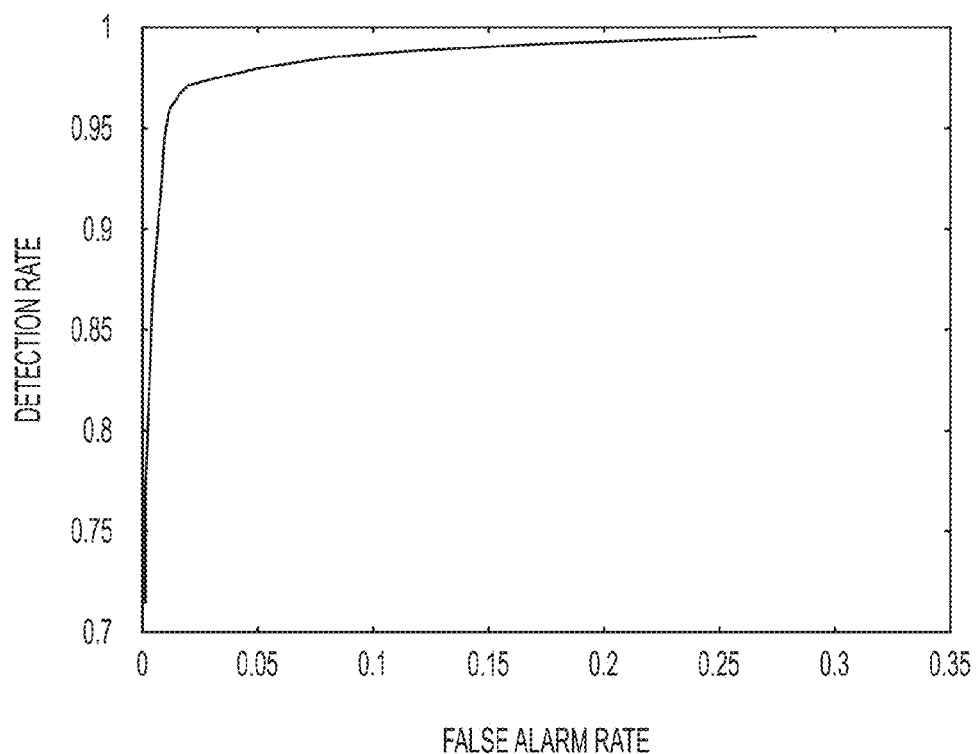
FIG. 3 illustrates Receiver Operation Characteristics (ROC) of an exemplary binary classifier.

Image 206 of FIG. 2 illustrates vessel regions 207 detected in the contrast image 204 using an exemplary binary classifier. The exemplary binary classifier used to detect the vessel regions 207 was trained using 1199575 examples of vessel image patches and 172544 examples of non-vessel image patches. FIG. 3 illustrates the Receiver Operation Characteristics (ROC) of the exemplary binary classifier.

To speed up the process of vessel segment detection, ridge-like image structures are first located in the contrast image through the use of steerable filters, as described above and illustrated in FIG. 4, and the vessel segment detector is applied only to the image areas where ridge-like structures are present.

Returning to FIG. 1, at step 108, background motion is estimated between each of the mask images and the background region of the contrast image. As described above, the background region $\Omega^C$ of the contrast image is obtained by excluding the detected vessel regions $\Omega$ from the original contrast image. A dense motion field is calculated between each mask image and the background region of the contrast image resulting in multiple motion field estimates. The covariances of the displacement vectors of the motion field estimates are also calculated. According to an advantageous embodiment, the Lucas-Kanade-Fusion (LKF) algorithm is used to estimate a dense motion field v(x) between each mask image and the background region of the contrast image. The LKF algorithm is described in detail in United States Published Patent Application 2010/0034446, which is incorporated herein by reference. The LKF algorithm combines the Lucas-Kanade algorithm, which iteratively estimates incremental motion, and a covariance-based filtering technique to retain spatial smoothness and consistency of the motion field. For every pixel x of a mask image, the LKF algorithm calculates an estimate of the displacement vector $\hat{v}(x)$ locally. In addition, the LKF algorithm also estimates covariance $C(\hat{v}(x))$ of the motion field to characterize the uncertainty in the motion estimation. In homogenous image areas with lack of textures or areas with vessel pixels excluded from motion calculation, the motion estimated tend to be unreliable and their covariance matrices have large eigenvalues. Image 208 of FIG. 2 illustrates a motion field estimated between a mask image and the background region of contrast image 204.

Returning to FIG. 1, at step 110, a background layer prediction is generated for each mask image based on the motion estimate and covariance calculated for each mask image. This results in multiple predictions for the background layer of the contrast image, each background layer prediction corresponding to one of the mask images. The background layer prediction for each mask image is generated using uncertainty propagation based on the motion estimate and the covariance, which results in a probability density function that predicts the pixel values of the background layer of the contrast image.

Given the motion estimation $\hat{v}(x)$ and its covariance $C(\hat{v}(x))$, the probability distribution of the motion vector v(x) can be approximated as a Gaussian distribution with mean $\hat{v}(x)$ and covariance $C(\hat{v}(x))$, such that:

$$v(x) \sim N(\hat{v}(x), C(\hat{v}(x))); E[v(x)] = \hat{v}(x), Cov[v(x)] = C(\hat{v}(x)). \quad (1)$$

Pixel values in the background layer $I_{B,t}(x)$ are predicted from the mask image:

$$I_{B,t}(x) = I_m(x+v(x)). \quad (2)$$

According to an advantageous embodiment of the present invention, second order statistics are incorporated in order to derive the prediction probability functions of pixel values in the background layer $p(I_{B,t}(x)|I_m)$. In general, the transformation function $I_m(x+v(x))$ is a nonlinear function of v(x) and techniques such as linearization and unscented transformation are required to parameterize the means and covariances of the probability distribution. Due to the computational complexity of the unscented transformation, the transformation function can be linearized as follows:

$$I_m(x+v(x)) \approx I_m(x+\hat{v}(x)) + \nabla^T I_m(x+\hat{v}(x))[v(x)-\hat{v}(x)]$$

$$\nabla I_m(x+v(x)) = [\partial_x I_m(x+\hat{v}(x)), \partial_y I_m(x+\hat{v}(x))]^T \quad (3)$$

where $\nabla I_m(x+v(x))$ denotes the gradient vector of the transformed image $I_m(x+v(x))$. The mean and variance of $I_{B,t}(x)$ can be approximated as:

$$E[I_{B,t}(x)|I_m] = I_m(x+\hat{v}(x))$$

$$Var[I_{B,t}(x)|I_m] = \nabla^T I_m(x+\hat{v}(x)) \cdot C(\hat{v}(x)) \cdot \nabla I_m(x+\hat{v}(x)) \quad (4)$$

Through linearization of the transformation function, the uncertainties in motion estimation are propagated to the prediction of the pixel values of the background layer. The prediction probability density function can be approximated by a Gaussian as:

$$p(I_{B,t}(x)|I_m) = N(I_{B,t}(x); E[I_{B,t}(x)|I_m], Var[I_{B,t}(x)|I_m]). \quad (5)$$

Images 210 show multiple background layer predictions.

Returning to FIG. 1, at step 112, the multiple background layer predictions are combined using statistical fusion to generate a final estimated background layer. In cardiac interventional procedures, sequences of fluoroscopic images showing cardiovascular structures are acquired in motion to provide real-time image guidance. Multiple image frames are often captured before a contrast medium flows into coronary arteries. These pre-contrast frames capture the background layer from different cardiac and respiratory phases and are used as static mask images. In order to deal with large image motion caused by deep breathing, estimated background layers from previous contrast frames can also be included as dynamic mask images.

Denote $\{I_{m,i}(x): i=1, \ldots, n_s\}$ as the static mask images acquired at time $t_1, \ldots t_{n_s}$, and $\{I_{D,k}(x) = I_{B,t-k}(x): k=1, \ldots n_d\}$ as the dynamic mask images, which are the estimated background layers of frames $t-1, \ldots, t-n_d$. Through motion estimation (step 108) and uncertainty propagation (step 110), multiple prediction probability density functions of the background layer are obtained:

$$p(I_{B,t}(x)|I_{m,t_i}) = N(I_{B,t}(x); m_{t,t_i}(x), \sigma^2 t, t_i(x)) \ (i=0, \ldots, n_s)$$

$$p(I_{B,t}(x)|I_{D,k}) = N(I_{B,t}(x); m_{t,t-k}(x), \sigma^2 t, t-k(x)) \ (k=0, \ldots, n_d) \quad (6)$$

where $m_{t,t_i}(x) = E[I_{B,t}(x)|I_{m,t_i}]$, $\sigma_{t,t_i}^2(x) = Cov[I_{B,t}(x)|I_{m,t_i}]$ $m_{t,t-k}(x) = E[I_{B,t}(x)|I_{D,k_i}]$, $\sigma_{t,t-k}^2(x) = Cov[I_{B,t}(x)|I_{D,k_i}]$ are the estimated mean and covariance of the background pixel values. Fusing multiple predictions of the background layer is achieved by calculating the linear minimum-mean-square-error (MMSE) estimate as:

$$\hat{I}_{B,t}(x) = \frac{\sum_{i=0}^{n_s} \sigma_{t,t_i}^{-2}(x) m_{t,t_i}(x) + \sum_{i=0}^{n_d} \sigma_{t,t-k}^{-2}(x) m_{t,t-k}(x)}{\sum_{i=0}^{n_s} \sigma_{t,t_i}^{-2}(x) + \sum_{i=0}^{n_d} \sigma_{t,t-k}^{-2}(x)}. \quad (7)$$

Equation (7) results in the final estimated background layer $\hat{I}_{B,t}(x)$ of the contrast image. Image 212 of FIG. 2 shows the final estimated background layer of contrast image 204.

Returning to FIG. 1, at step 114, the coronary vessel layer is extracted from the contrast image by subtracting the final estimated background layer from the contrast image. Accordingly, once the final estimated background layer $\hat{I}_{B,t}(x)$ is generated, the coronary layer $\hat{I}_{C,t}(x)$, is generated by subtracting the final estimated background layer from the original contrast image $I_t(x)$, such that:

$$\hat{I}_{C,t}(x) = I_t(x) - \hat{I}_{B,t}(x) \tag{8}$$

Image 214 of FIG. 2 illustrates the coronary vessel layer (foreground layer) of contrast image 204.

At step 116, a coronary enhanced image is generated. Once the coronary vessel layers are extracted from the contrast image, it is possible to virtually enhance the coronary vessels in the contrast image. This is a direct clinical application of the coronary DSA method can save contrast medium and lower radiation. With the background layer separated from the coronary layer, it is straightforward to fade out the background layer or to enhance the coronary layer by layer composition. Accordingly, an enhanced contrast image can be obtained as:

$$\alpha_C \hat{I}_{C,t} + \alpha_B \hat{I}_{B,t} \ (\alpha_C \geq 1, 0 \leq \alpha_B \leq 1) \tag{9}$$

For example, to fade out the background layer, $\alpha_C$ can be set to $\alpha_C=1$ and $\alpha_B$ can be decreased. To virtually enhance the contrast of the coronary vessels, $\alpha_B$ can be set to $\alpha_B=1$ and $\alpha_C$ can be increased. Image 216 of FIG. 2 shows a faded background image and image 218 of FIG. 2 shows an enhanced coronary image generated for contrast image 204.

At step 116, the extracted coronary vessel layer and the coronary enhanced image are output. The extracted coronary vessel layer can be output by displaying the coronary vessel layer as an image on a display device. Similarly, the coronary enhanced image can be output by displaying the coronary enhanced image on a display device. The coronary vessel layer and coronary enhanced image may also be output by storing the coronary vessel layer and/or the coronary enhanced image, for example, in a computer readable medium or storage or memory of a computer system.

Figure 5:
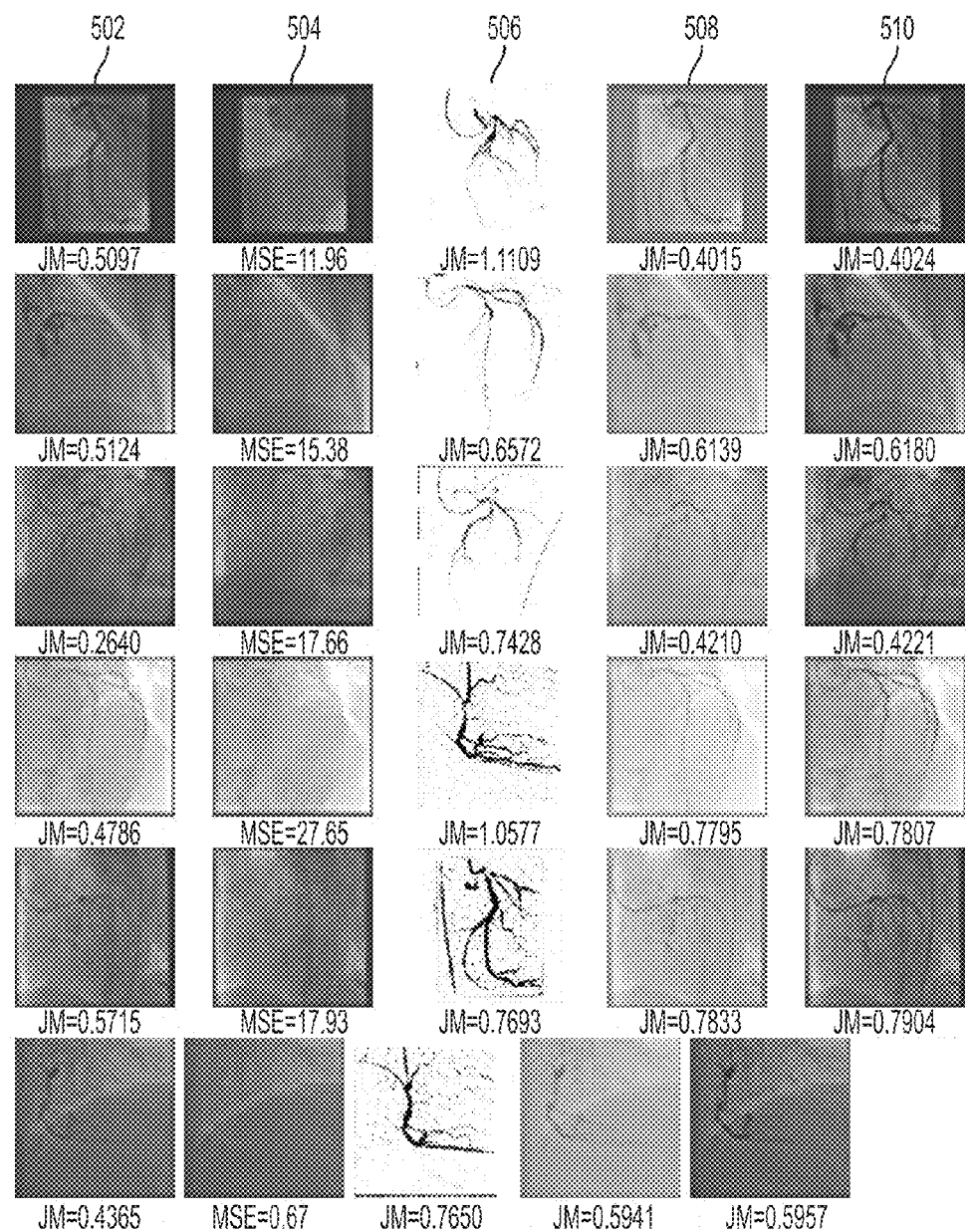
FIG. 5 illustrates exemplary results of the coronary DSA method of FIG. 1.

FIG. 5 illustrates exemplary results of the coronary DSA method of FIG. 1. As illustrated in FIG. 5, column 502 shows original contrast images, column 504 shows the corresponding final estimated background images, column 506 shows the corresponding coronary vessel layers extracted from contrast images 502, column 508 shows images with faded background, and column 510 shows images with enhanced coronary layers.

Figure 6:
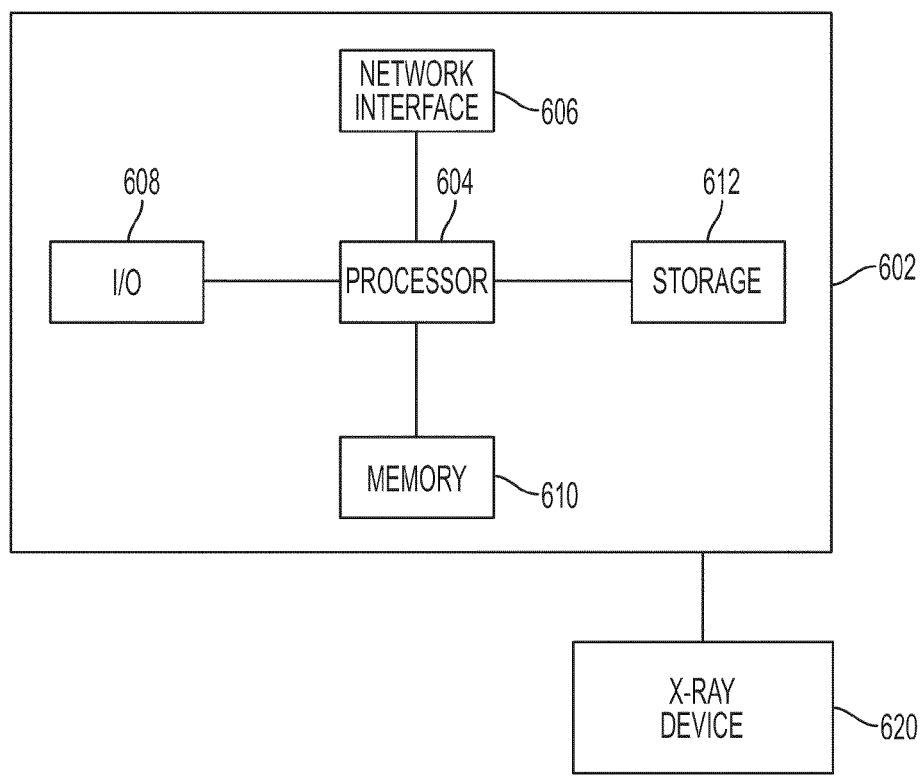
FIG. 6 is a high level block diagram of a computer capable of implementing the present invention.

The above-described methods for extracting coronary vessel layers from a sequence of fluoroscopic contrast images may be implemented on a computer using well-known computer processors, memory units, storage devices, computer software, and other components. A high level block diagram of such a computer is illustrated in FIG. 6. Computer 602 contains a processor 604 which controls the overall operation of the computer 602 by executing computer program instructions which define such operation. The computer program instructions may be stored in a storage device 612 (e.g., magnetic disk) and loaded into memory 610 when execution of the computer program instructions is desired. Thus, applications for performing the above-described method steps of the method of FIG. 1 can be defined by the computer program instructions stored in the memory 610 and/or storage 612 and controlled by the processor 604 executing the computer program instructions. Furthermore, sets of mask images, sequences of contrast images, and output coronary vessel layers and background layers can be stored in the storage 612 and/or the memory 610. The computer 602 also includes one or more network interfaces 606 for communicating with other devices via a network. An X-ray device 620, such as an Angiograph C-arm system, can be connected to the computer 602 to input the contrast images and the mask images to the computer 602. It is possible to implement the X-ray device 620 and the computer 602 as one device. It is also possible that the X-ray device 620 and the computer 602 communicate wirelessly through a network. The computer 602 also includes other input/output devices 608 that enable user interaction with the computer 602 (e.g., display, keyboard, mouse, speakers, buttons, etc.) One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for extracting coronary vessels from a contrast image, comprising:
    calculating a motion field between each of a plurality of mask images and a background region of the contrast image and calculating covariances of motion vectors of each motion field;
    generating a plurality of background layer predictions by generating a background layer prediction from each of the plurality of mask images based on the motion field and the covariances of the motion field from each of the plurality of mask images;
    combining the plurality of background layer predictions using statistical fusion to generate a final estimated background layer; and
    extracting a coronary vessel layer from the contrast image by subtracting the final estimated background layer from the contrast image.

2. The method of claim 1, wherein said step of calculating a motion field between each of a plurality of mask images and a background region of the contrast image and calculating covariances of motion vectors of each motion field comprises:
    detecting vessel regions in the contrast image using learning-based vessel segment detection;
    determining the background region of the contrast image based on the detected vessel regions; and
    estimating background motion between each of the plurality of mask images and the background region of the contrast image by estimating the motion field between each of the plurality of mask images and the background image and performing covariance-based filtering over the estimated motion field.

3. The method of claim 1, further comprising:
    receiving a sequence of contrast images of a coronary region, wherein said contrast image is one of the sequence of contrast images; and repeating said steps of receiving a contrast image, calculating a motion field, generating a plurality of background layer predictions, combining the plurality of background layer predictions, and extracting a coronary vessel layer from the contrast image for each of the sequence of contrast images.

4. The method of claim 1, wherein the plurality of mask images comprises a sequence of mask images of the coronary region taken over at least one full cardiac cycle.

5. The method of claim 1, wherein said step of detecting vessel regions in the contrast image comprises:
applying a set of steerable filters to the contrast image to detect ridge features in the contrast image; and
detecting vessel segments at the detected ridge features using a learned binary classifier.

6. The method of claim 1, wherein said step of generating a plurality of background layer predictions by generating a background layer prediction from each of the plurality of mask images based on the motion field and the covariances of the motion field from each of the plurality of mask images comprises:
determining a predication probability density function for each mask image to predict pixel values of the background layer based on the motion field and covariances using uncertainty propagation.

7. The method of claim 1, wherein said step of combining the plurality of background layer predictions using statistical fusion to generate a final estimated background layer comprises:
fusing multiple prediction probability density functions of the background layer by calculating a minimum-mean-square error (MMSE) estimate.

8. The method of claim 7, wherein the multiple prediction probability density functions of the background layer comprise the plurality of background layer predictions generated from the plurality of mask images and one or more predictions generated from background layer estimates of one or more previous contrast images in a sequence of contrast images.

9. The method of claim 1, further comprising:
generating an enhanced coronary image by enhancing coronary vessels in the contrast image based on the extracted coronary vessel layer.

10. The method of claim 1, further comprising:
generating an enhanced coronary image by fading the final estimated background layer in the contrast image.

11. An apparatus for extracting coronary vessels from a contrast image, comprising:
means for calculating a motion field between each of a plurality of mask images and a background region of the contrast image and calculating covariances of motion vectors of each motion field;
means for generating a plurality of background layer predictions by generating a background layer prediction from each of the plurality of mask images based on the motion field and the covariances of the motion field from each of the plurality of mask images;
means for combining the plurality of background layer predictions using statistical fusion to generate a final estimated background layer; and
means for extracting a coronary vessel layer from the contrast image by subtracting the final estimated background layer from the contrast image.

12. The apparatus of claim 11, wherein said means for calculating a motion field between each of a plurality of mask images and a background region of the contrast image and calculating covariances of motion vectors of each motion field comprises:
means for detecting vessel regions in the contrast image using learning-based vessel segment detection;
means for determining the background region of the contrast image based on the detected vessel regions; and
means for estimating background motion between each of the plurality of mask images and the background region of the contrast image by estimating the motion field between each of the plurality of mask images and the background image and performing covariance-based filtering over the estimated motion field.

13. The apparatus of claim 11, wherein the plurality of mask images comprises a sequence of mask images of the coronary region taken over at least one full cardiac cycle.

14. The apparatus of claim 11, wherein said means for generating a plurality of background layer predictions by generating a background layer prediction from each of the plurality of mask images based on the motion field and the covariances of the motion field from each of the plurality of mask images comprises:
means for determining a predication probability density function for each mask image to predict pixel values of the background layer based on the motion field and covariances using uncertainty propagation.

15. The apparatus of claim 11, wherein said means for combining the plurality of background layer predictions using statistical fusion to generate a final estimated background layer comprises:
means for fusing multiple prediction probability density functions of the background layer by calculating a minimum-mean-square error (MMSE) estimate.

16. The apparatus of claim 15, wherein the multiple prediction probability density functions of the background layer comprise the plurality of background layer predictions generated from the plurality of mask images and one or more predictions generated from background layer estimates of one or more previous contrast images in a sequence of contrast images.

17. The apparatus of claim 11, further comprising:
means for generating an enhanced coronary image by enhancing coronary vessels in the contrast image based on the extracted coronary vessel layer.

18. The apparatus of claim 11, further comprising:
means for generating an enhanced coronary image by fading the final estimated background layer in the contrast image.

19. The apparatus of claim 11, further comprising:
means for receiving the plurality of mask images; and
means for receiving a sequence of contrast images.

20. A non-transitory computer readable medium encoded with computer executable instructions for extracting coronary vessels from a contrast image, the computer executable instructions defining steps comprising:
calculating a motion field between each of a plurality of mask images and a background region of the contrast image and calculating covariances of motion vectors of each motion field;
generating a plurality of background layer predictions by generating a background layer prediction from each of the plurality of mask images based on the motion field and the covariances of the motion field from each of the plurality of mask images;

combining the plurality of background layer predictions using statistical fusion to generate a final estimated background layer; and
extracting a coronary vessel layer from the contrast image by subtracting the final estimated background layer from the contrast image.

21. The computer readable medium of claim 20, wherein the computer executable instructions defining the step of calculating a motion field between each of a plurality of mask images and a background region of the contrast image and calculating covariances of motion vectors of each motion field comprise computer executable instructions defining the steps of:
detecting vessel regions in the contrast image using learning-based vessel segment detection;
determining the background region of the contrast image based on the detected vessel regions; and
estimating background motion between each of the plurality of mask images and the background region of the contrast image by estimating the motion field between each of the plurality of mask images and the background image and performing covariance-based filtering over the estimated motion field.

22. The computer readable medium of claim 19, further comprising computer executable instructions defining the steps of:
receiving a sequence of contrast images of a coronary region, wherein said contrast image is one of the sequence of contrast images; and
repeating said steps of receiving a contrast image, calculating a motion field, generating a plurality of background layer predictions, combining the plurality of background layer predictions, and extracting a coronary vessel layer from the contrast image for each of the sequence of contrast images.

23. The computer readable medium of claim 20, wherein the plurality of mask images comprises a sequence of mask images of the coronary region taken over at least one full cardiac cycle.

24. The computer readable medium of claim 19, wherein the computer executable instructions defining the step of generating a plurality of background layer predictions by generating a background layer prediction from each of the plurality of mask images based on the motion field and the covariances of the motion field from each of the plurality of mask images comprise computer executable instructions defining the step of:
determining a predication probability density function for each mask image to predict pixel values of the background layer based on the motion field and covariances using uncertainty propagation.

25. The computer readable medium of claim 19, wherein the computer executable instructions defining the step of combining the plurality of background layer predictions using statistical fusion to generate a final estimated background layer comprise computer executable instructions defining the step of:
fusing multiple prediction probability density functions of the background layer by calculating a minimum-mean-square error (MMSE) estimate.

26. The computer readable medium of claim 25, wherein the multiple prediction probability density functions of the background layer comprise the plurality of background layer predictions generated from the plurality of mask images and one or more predictions generated from background layer estimates of one or more previous contrast images in a sequence of contrast images.

* * * * *